July 11, 1933.   C. G. BUTLER   1,917,238
LUBRICATING SYSTEM
Filed Oct. 25, 1929   4 Sheets-Sheet 1

INVENTOR
Clyde G. Butler
BY Wood & Wood ATTORNEYS

July 11, 1933.  C. G. BUTLER  1,917,238
LUBRICATING SYSTEM
Filed Oct. 25, 1929  4 Sheets-Sheet 3
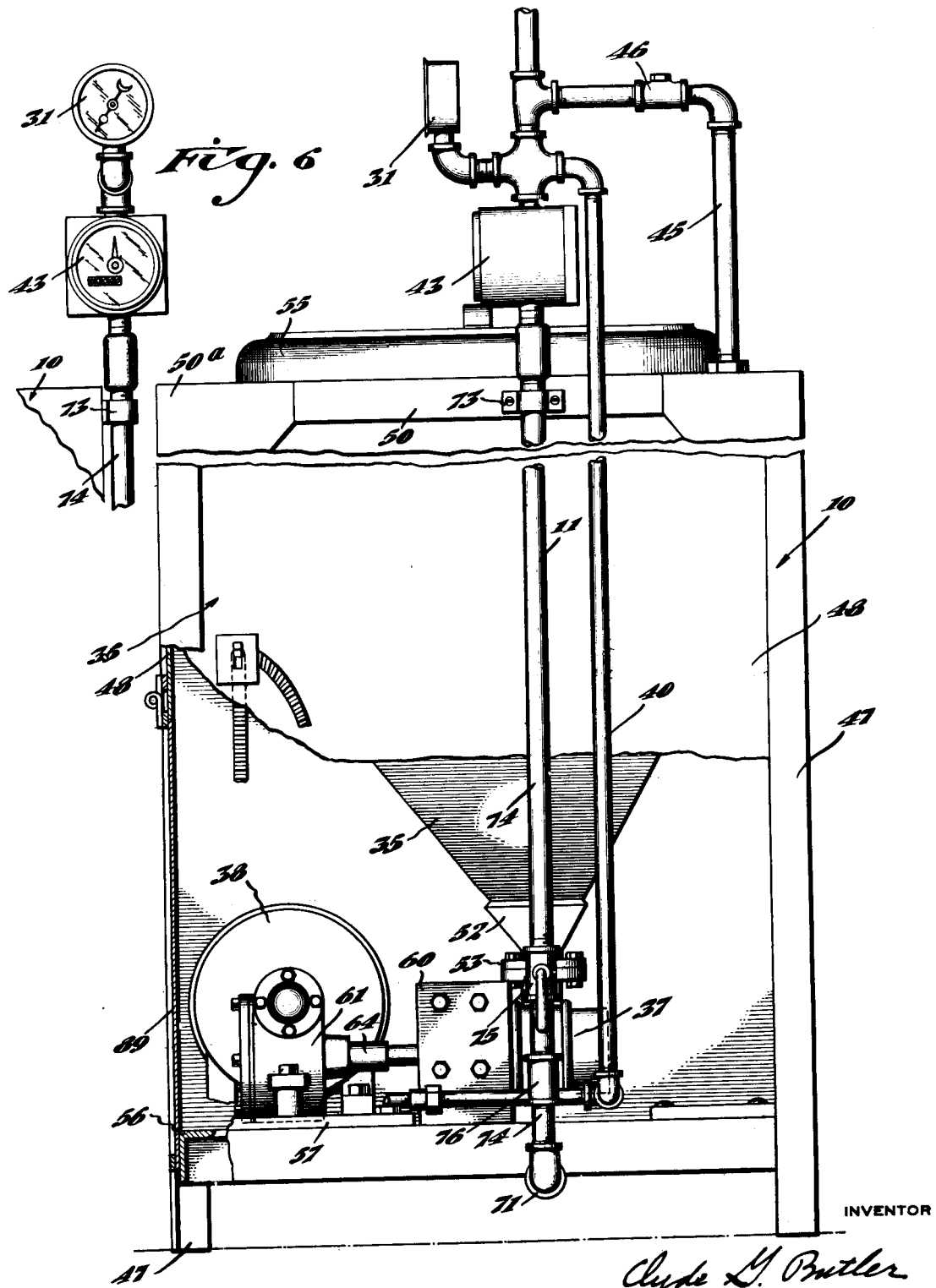

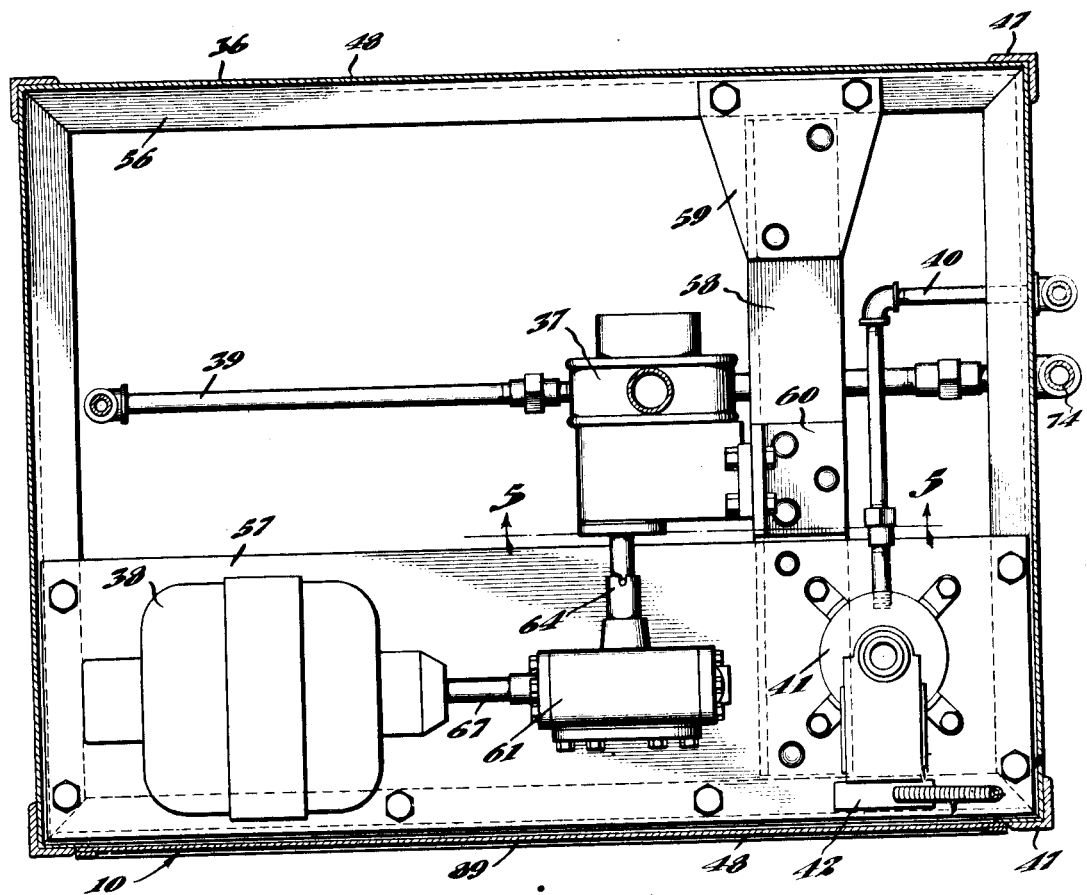
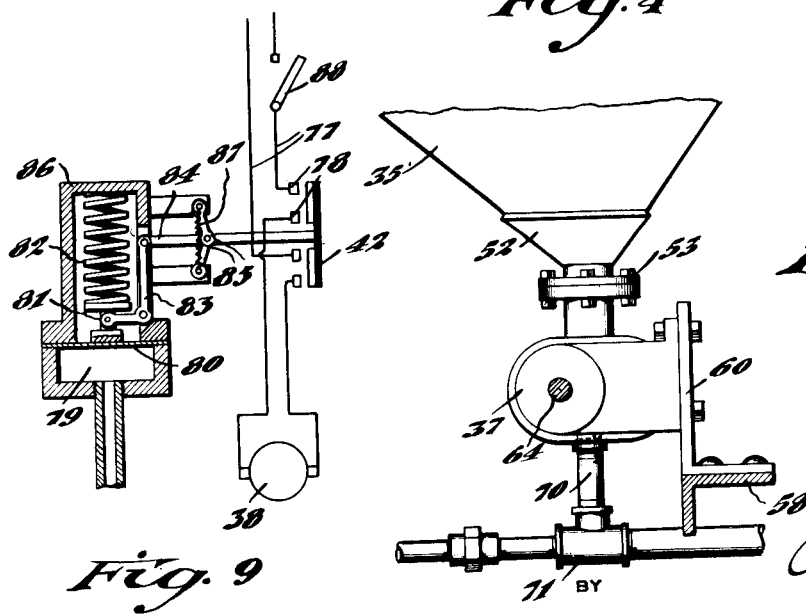

Patented July 11, 1933

1,917,238

UNITED STATES PATENT OFFICE

CLYDE G. BUTLER, OF CINCINNATI, OHIO, ASSIGNOR, BY MESNE ASSIGNMENTS, TO RUSSELL J. GRAY, OF MINNEAPOLIS, MINNESOTA

LUBRICATING SYSTEM

Application filed October 25, 1929. Serial No. 402,514.

This invention relates to lubricating apparatus and is particularly directed to a centralized lubricating system including an improved pumping unit for the system whereby the unit supplies grease, in uniform and automatically controlled flow, to a plurality of greasing stations.

The invention is therefore also specifically directed to an improved construction for the pumping unit for maintaining an adequate and constant supply of grease in a main line or header, and to means for efficiently conveying the grease in combination with an air supply conduit from the main line to the devices for discharging the grease into the parts to be lubricated.

It has been customary in automobile greasing operations to utilize grease guns, either hand or air operated, which have been filled by hand, thus greatly inconveniencing the workman, due to the nature of the material used, and greatly decreasing the speed of the servicing operations. It is therefore an object of this invention to provide a greasing means wherein the grease is supplied to the gun in a close packed flow under pressure as needed.

With the advent of the high pressure air gun for greasing, it was necessary to have an air pressure line connected to the gun and for this reason the present invention also provides as one of its features, a double conduit for each gun, one conduit housing the other, respectively grease and air conduits, this arrangement reducing the conduit connections to the gun to a minimum for convenience in handling the gun.

A still further object is to provide an efficient connection of the air and grease lines or conduits to the respective separate air and grease supply sources.

Still another object is to provide a centralized system wherein a plurality of stations or pits, each equipped with a gun or a plurality of guns, are constantly supplied with a steady and uniform flow of grease by means of a common pumping unit. Other objects, relative to the pumping unit, concern the features of compactness, safety and accurate control of the grease flow to the guns.

Other objects and further advantages will be more fully set forth in a description of the accompanying drawings, in which:

Figure 3 is an end elevation of the pumping unit partly in section, the view being broken away to further illustrate the pumping mechanism below the grease tank.

Figure 4 is a sectional view taken on line 4—4, Figure 2, illustrating the pumping and control means in plan view.

Figure 5 is a sectional view taken on line 5—5, Figure 4, showing the arrangement of the pump and discharge conduit relative to the base of the grease tank.

Figure 6 is a view illustrating the meter and gauge incorporated in the grease discharge line.

Figure 9 is a diagrammatic view illustrating the pressure device, the switch and the various electrical connections for controlling the motor.

Figure 1:
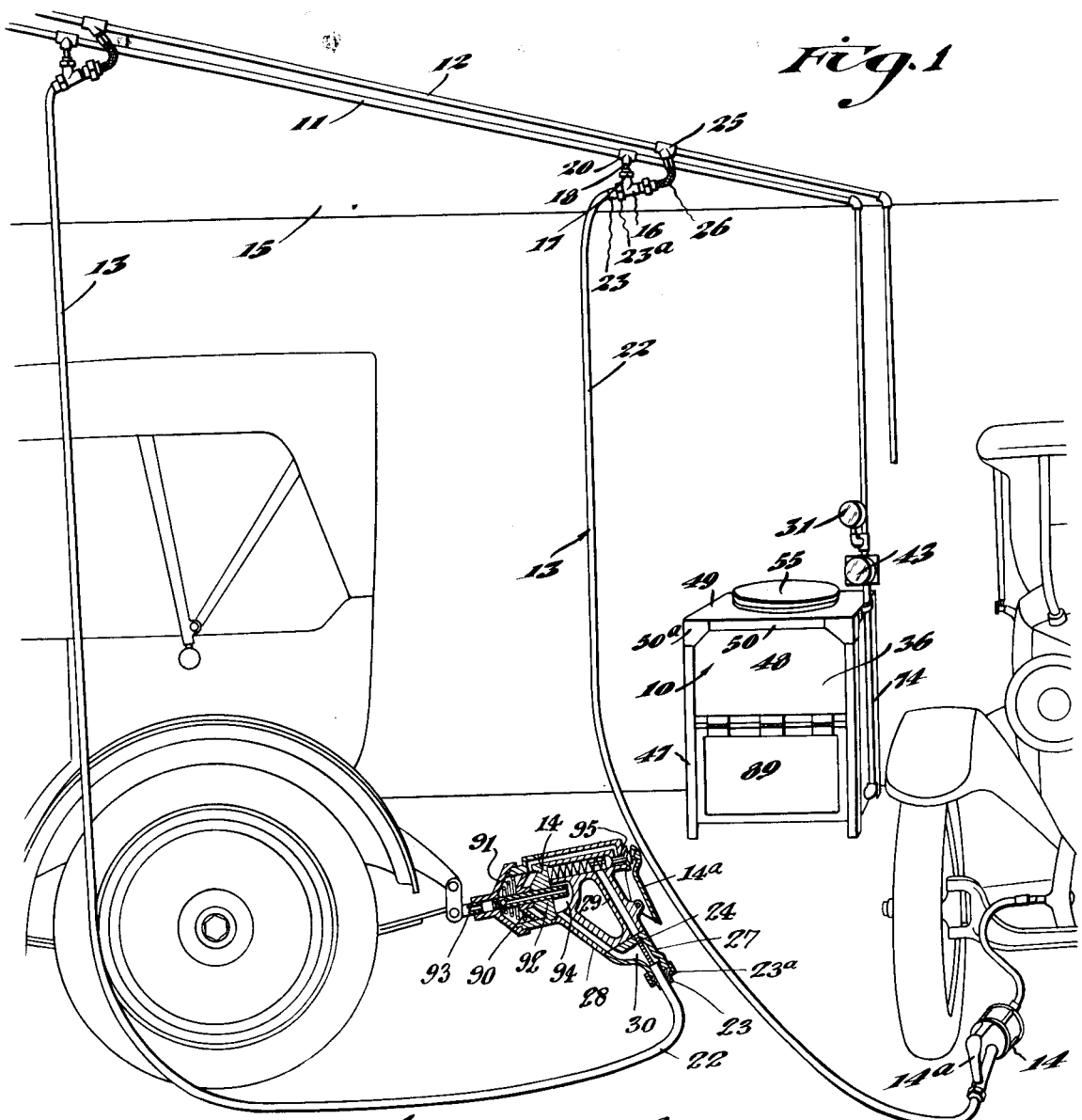
Figure 1 is a general perspective view illustrating the entire system.

As illustrated in the drawings, an arrangement exemplifying the present invention comprises, a pumping unit 10, having a discharge header 11 extending therefrom and passing in proximity to each of the several pits or servicing stations, this header pipe constituting the main grease supply line and being closed at its outer end. A supply line or header 12 for air under pressure (the means for creating the pressure not being shown) extends parallel to the grease supply line and to the same points. From these headers, grease and air supply respectively, flexible connections or conduits 13 are extended to the pits, there being any number of connections or line extensions to each pit. A pneumatically operated grease gun 14 is provided at the end of each conduit for applying the grease to the parts or to the cars being greased.

Referring specifically to Figure 1, the headers 11, 12 are extended to and across the ceiling 15 and the flexible conduits 13 hung or suspended from the headers to the region of the pits or stations.

Figure 8:
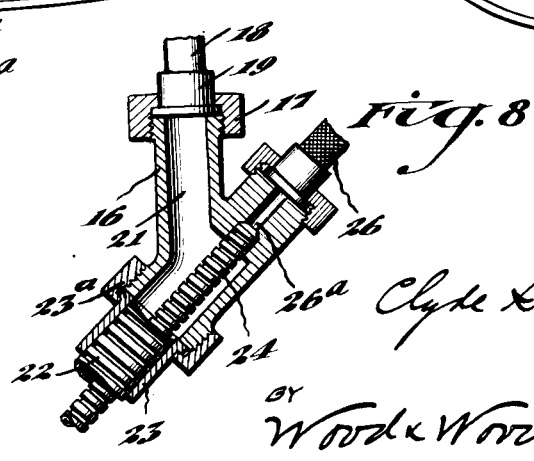
Figure 8 is a sectional view showing the connection of the grease and air lines for each gun to the respective main supply lines.

As shown in Figure 8 a junction fitting or irregular pipe T 16 is attached to the grease supply header by means of a nut 17 connecting the same to the nipple 18 of a T 20 inserted in the grease line. A headed sleeve 19 secured on the end of the nipple 18 is drawn down against the end of the angle extension of the junction fitting 16 by means of the inwardly flanged nut 17. This completes the grease passageway into and through a large passageway 21 in the fitting and the flexible grease conduit 22 is connected to the other end of the large passageway. The attachment of the flexible conduit 22 is by means of a headed sleeve 23 welded to the end of the conduit and drawn against the end of the fitting 16 by means of a flanged nut 23ª.

The air supply is provided through a small conduit 24 extending through the grease conduit. A pipe T 25 is provided in the header or main air line 12, this T being connected to the end of the fitting opposite to that having the large opening by a section of flexible tubing 26, this connection being of the same form as the connection of the fitting to the nipple 18. The air conduit 24 extending through the grease conduit is much smaller in diameter and is secured internally of the fitting into a small bore 26ª exteriorly entered by the short section of flexible tubing 26.

The grease discharge or directing device 14 at the end of each flexible conduit may be of any form. In the type illustrated, a throttle 14ª is provided at the back end of the gun and the air and grease connections are immediately below the throttle.

Figure 7:
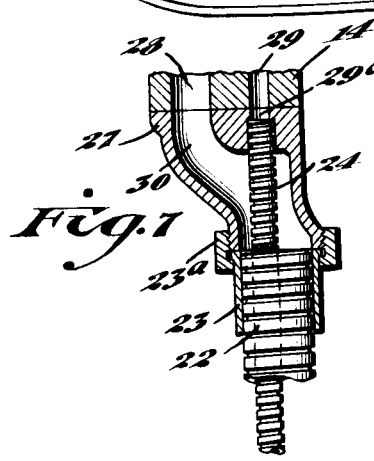
Figure 7 is a view illustrating the connection of the grease and air conduits to the gun.

A coupling element 27 (see Figure 7) covers the grease and air passageways, respectively 28, 29, extending into the gun, the larger one of the passageways, namely 28, communicating with the grease conduit 22 by way of an enlarged passageway 30 in the coupling element 27, the lower end of the grease conduit 22 being connected to this element in the same manner as the upper end is connected to the junction fitting 16.

The air conduit 24 extends from the end of the grease conduit across the large opening in the coupling member and is secured within a small bore 29ª communicating with the small passageway 29 in the gun extending to the operating piston 90 movable in the cylinder 91. This operating piston carries a tubular high pressure plunger 92, one end of which plunger enters the high pressure grease chamber in the forward end of the nozzle 93 and the rear end of which extends into a grease chamber 94 at the end of the grease intake passageway of the gun. A valve 95 is included in the passageway 29 for controlling the supply of air to the air cylinder and appropriate valves are included in the nozzle and the tubular plunger for controlling the discharge and intake of grease from and to the high pressure grease chamber. The pressure boosting instrumentalities disclosed in this application are fully disclosed in the patent to Butler No. 1,752,270 and it is, therefore, not believed necessary to describe the further details thereof.

The pumping unit is designed to force the grease through the main air line into the respective guns and to maintain it in close-packed condition therein at all times. Lubricating grease, although relatively solid, is subject to compression due to the presence of air therein and for this reason it is possible to place the grease under pressure although the condition is more aptly described as closely packed.

A gauge 31 is provided on the pump or within the grease supply line for indicating the pressure of the grease in the header. It will be apparent that this pressure rises very abruptly when the line is completely filled, but as explained before, there is a slight compression of the grease possible, thereby presenting an opportunity to gauge the pressure and to provide a pressure actuated device for automatically starting the motor of the pump when a slight amount of grease has been discharged and the pressure in the grease line lowers.

Referring to Figures 2 to 6 of the drawings, the pumping unit 10, described in general, is of the following construction. A grease container or tank 35 is suspended within a pump closure or cabinet 36 and a pump 37 is located beneath and in communication with the tank. The pump is driven by means of a motor 38 and the grease is forced from the pump into the supply line or header 11.

A by-pass line 39 is provided extending from the supply line into the tank, this by-pass being valve controlled for arbitrarily directing the pumped grease back into the tank when desired as under test conditions or for priming the system.

A secondary or control pipe 40 extends from the discharge line to a pressure device 41 within which an electric switch 42 is contained for controlling the starting and stopping of the motor. A meter 43 and gauge 31 are also inserted in the discharge supply line for determining the volume of grease used and the pressure in the header. The pressure-stat is adjustable for operation at any desired pressures to start and stop the motor by means of the switch 42.

A return line 45 is provided extending from the supply header line back into the tank, this by-pass being provided with a relief or unloader valve 46. The return line and unloader valve therein are provided for relieving abnormal grease pressure. When atmospheric conditions change, causing expansion of the grease, the pressure in the line rises and would ultimately damage the line. This condition is relieved by having the safety valve operate at a predetermined pressure.

Describing the drawings in detail and referring specifically to Figures 2 to 6 inclusive, the following construction is provided:

The cabinet 36 is formed of angle iron strips with panels 48 of sheet metal plate attached thereto, the panels constituting the respective sides of the cabinet and being secured to the inside of the angle iron lengths. Vertically disposed corner lengths 47 constitute the legs for the cabinet. The upper edges of side plates 48 and a top plate 49 are bound by means of angle iron lengths 50 disposed and attached along the four corners with the jointure of the legs 47 and angle iron lengths 50 strengthened by gusset plates 50ᵃ.

Figure 2:
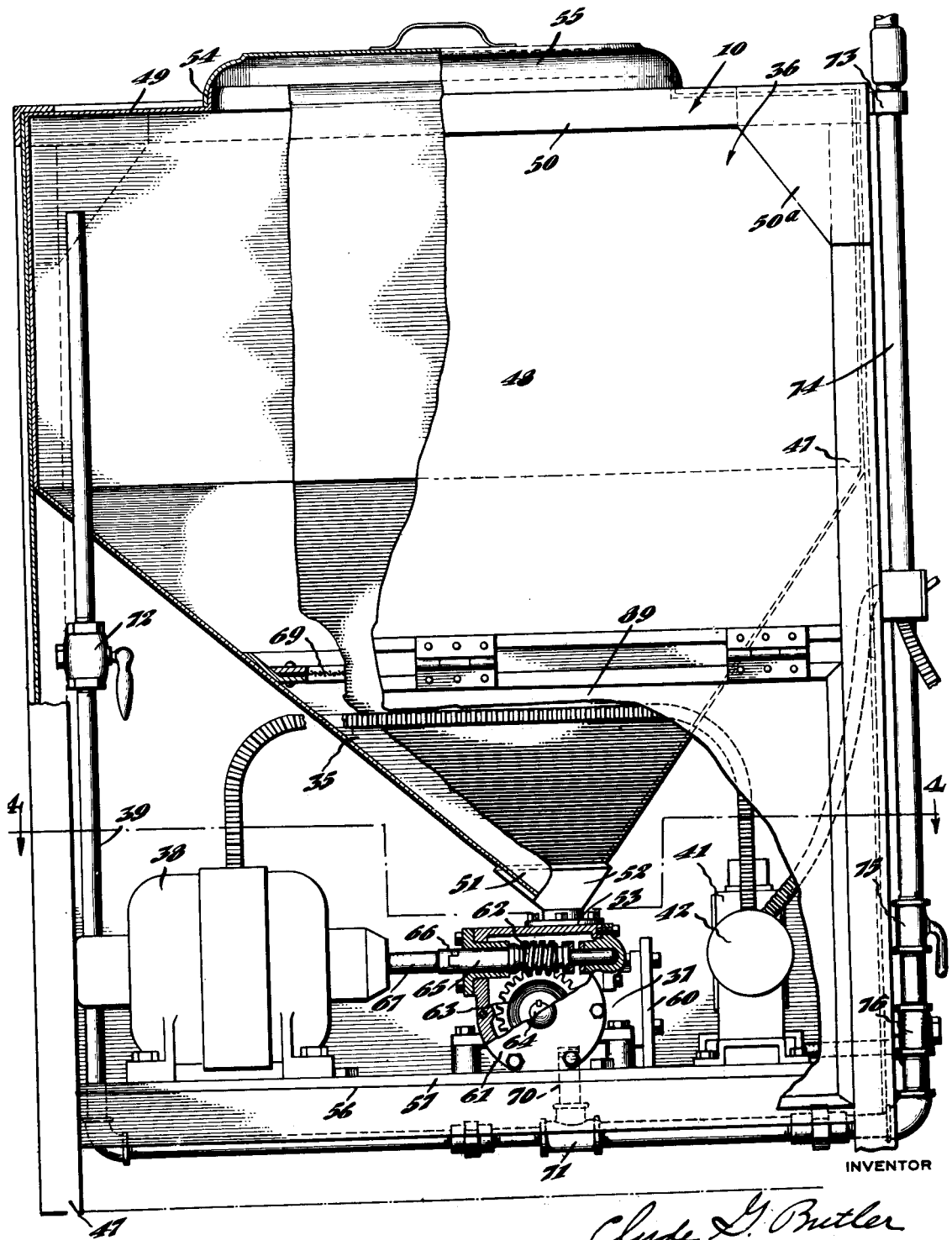
Figure 2 is a front view, partly in section, of the pumping unit, the view being broken away and shown in section in various planes to illustrate the pumping mechanism and the construction of the tank and pump enclosure.

As illustrated in Figure 2, the tank 35 hung in the cabinet has a conical bottom providing a funnel-shaped discharge opening 51, this opening being bound or capped by a funnel element 52, the funnel element providing a circular base flange 53 which is attached to the top of the pump 37. The tank may be secured to the plates of the cabinet by any suitable means such as bolts, spot welding, etc.

The top plate 49 of the cabinet which constitutes the top of the tank has a circular opening therein provided with an upturned marginal flange 54 providing a rim for receiving a lid 55.

A ledge 56 is provided at the base of the cabinet being formed of angle iron rails secured to the plates and legs, this ledge having a base plate 57 secured thereon. The base plate has a lateral extension formed by an angle iron cross rail 58, one end of which is secured to the plate and the other of which is secured to one of the rails making up the ledge by means of a gusset plate 59.

The pump may be of any standard construction, a gear pump being used in this instance, the support bracket 60 of which is attached to or supported on the cross rail by means of bolts.

A transmission unit 61 is mounted on the base plate 57 and includes a worm 62 and a worm wheel 63. The worm wheel 63 is keyed to a shaft 64 which extends from the transmission across to a connection in the pump. The worm 62 is formed on a shaft 65 which extends out of the transmission casing to a universal joint 66 connecting it to the shaft 67 of the motor.

The motor is automaticaly controlled as described hereinafter for actuating the pump and the grease is drawn from the tank and discharged into the header 11 connected to the discharge side of the pump. A screen 69 is provided in the tank to strain the grease. The outlet or discharge side of the pump has a nipple 70 connected thereto, this nipple extending downwardly and being screwed into a T 71 inserted in a line of pipe disposed along the under side of the base plate. One end of this pipe, namely 39, turns upwardly and extends into the bottom of this tank, a valve 72 being interposed in this extension below the entrance into the tank. This arrangement provides the by-pass for priming or test pumping action. The opposite end of the pipe also turns upwardly as at 74 beyond the end side of the plate and extends up and is secured to the side of the cabinet by brackets 73, this upward extension connecting to the header and also being provided with a valve or stop cock 75 and a check valve 76, the latter valve preventing back pressure from the header into the pump when the pump is idle.

The meter 43 and the pressure gauge 31 are inserted in the mentioned order in the last mentioned upward extension, above the valve 75. From the meter and gauge the pipe continues as a supply line to the header which is disposed along the ceiling as previously described.

At a point above the valve and adjacent the gauge, the secondary or control pipe 40 is connected to the supply line, this pipe extending downwardly and into the lower region of the cabinet where it is connected to the pressure actuated control device 41 secured on the base plate. The details of the pressure control means are only diagrammatically shown in Figure 9 inasmuch as this device is of standard make, being known to trade as a pressure-stat. The electric switch 42 included with this device is actuated thereby to automatically make or break the electric circuit to the motor at a predetermined pressure in the supply line.

Referring to Figure 9, the control means is of the following nature. Motor leads 77—77 are connected to the motor 38, these leads being broken and respective pairs of switch contacts 78 interposed therein. A main mechanically operated switch 88 is provided at the side of the cabinet in one of the incoming leads. The switch 42 is designed to simultaneously bridge the respective contacts to complete the circuits. The "pressure-stat" connected to the switch 42 has a grease chamber 79 therein, admitting the grease from the header against a diaphragm 80 operating a plunger 81 against an adjustable spring. The plunger is pivotally connected to one arm of a bell crank lever 83, the other arm 82 of the lever being pivotally connected to the end of a switch rod 84. Switch rod movement is controlled by means of toggle levers 85 having commonly connected ends attached to the rod and outer ends guided in slots of the frame 86 being internally arranged relative to movement of the rod. The outer ends of the levers are drawn together by means of a tension spring 87. The levers function to cause sudden snapping of the switch into make and break positions.

The safety by-pass line 45 is connected to the supply line and extends to the top of the tank for by-passing the contents of the supply line back into the tank. The valve 46 inserted in this by-pass is in the nature of a safety valve of standard construction, adjusted to unload at a predetermined pressure. It will be noted that this valve acts as any undue rise in line pressure takes place and functions independently of the pump and pressure-stat. This valve has been provided because of the varying atmospheric conditions surrounding the system. Sudden rise in temperature causes the grease to expand and even a slight expansion will cause a tremendous rise in the pressure where grease is concerned inasmuch as it is comparatively solid and subject to little compression. Escape of the grease in the line back to the tank is prevented by the check valve 76 so the safety valve functions to relieve the pressure of the trapped grease in the above instance.

A door 89 is provided at one side of the cabinet toward the lower end thereof, this door being hinged along its upper edge. The door is provided for access to the pumping and controlling mechanism beneath the tank.

The system operates in the following manner. Presuming the supply line and header to be empty, the motor will be started by the throwing of the switch due to the lack of sufficient pressure in the pressure-stat. The pump will continue until the supply line and header have been filled and a pressure developed equal to the pressure at which the pressure-stat is designed to operate. At this point, assuming that the system is not in use, the pressure-stat will operate the switch to break the contacts and the motor will be idle with the desired pressure standing in the header.

As the various guns are put into use and grease is taken from the header and supply lines, the pressure falls quickly and the motor again will be started by action of the pressure-stat. As long as the pressure is below the predetermined pressure, the motor will continue to run and supply the header with a close-packed supply of grease under pressure.

The unit thus provided is compact and efficient and may be placed at any convenient location in the greasing plant or garage and the piping of the system arranged to suit the particular environment, depending on the number of pits and guns.

Having described my invention, I claim:

1. In a device of the class described, a grease pumping unit, a main grease supply header extending therefrom, a main air supply header, individual grease supply conduits connected to said grease header, a T for each grease supply conduit, said T having a relatively large passageway between two of its openings, the ends of said passageway respectively connected to the grease header and the individual grease conduits, and an individual air supply conduit extending from the air header through each individual grease conduit, said individual air supply conduits entering the small opening of the T and loosely traversing the large passageway of the T and the respective grease conduit.

2. A pumping unit, comprising, a cabinet, a conical tank hung in said cabinet, and a power driven pump mounted within the cabinet and connected to the small end of the conical tank entirely exteriorly of the tank.

3. A pumping unit, comprising, a cabinet, a tank suspended in said cabinet, said tank having a funnel shape bottom, pumping mechanism located in the lower region of said cabinet and in connection with the lower end of the tank, and a door in said cabinet providing access to said pumping mechanism.

4. A lubricating system for greasing automobiles comprising, a low pressure grease forcing device, a grease supply header connected to said forcing device, a plurality of flexible conduits connected to said header, a high pressure grease gun for each conduit having a grease chamber connected to the end of the respective flexible conduit, a main air supply source, conduits extending from said source to said grease guns, said guns including air cylinders and pistons in said air cylinders for discharging the grease in said grease chambers, said cylinders connected to said main air supply source, and means for individually and selectively controlling the connection of said air cylinders to said air supply source.

5. A centralized lubricating system, including, a low pressure grease feeding unit, a main supply header extending from said unit, a plurality of individual pressure boosting devices having high pressure grease chambers in connection with said header, piston means for developing high pressure within each chamber, and a pressure actuated device in connection with the supply header for controlling the grease feeding unit.

6. A lubricating system for greasing automobiles, comprising, a low pressure grease forcing device, a grease supply header connected to said forcing device, a plurality of flexible conduits connected to said header, a pneumatically operated grease discharge device at the end of each conduit, a main air supply conduit, individual air conduits extending from said main air supply conduit to said pneumatically operated grease discharge devices for operating the same, and means at each pneumatically operated grease discharge device for individually and selectively operating the pneumatically operated grease discharge devices.

7. In a device of the class described, a lubricant pumping unit, a lubricant supply header extending therefrom, an air supply header connected to a source of compressed air; individual flexible lubricant supply conduits connected to said lubricant header; individual flexible air supply conduits connected to said air supply header, each of said individual flexible air supply conduits being disposed within one of said individual flexible lubricant supply conduits throughout the major extent thereof, a combination lubricant and air conduit junction device for each individual flexible lubricant supply conduit and individual flexible air supply conduit, each of said junction devices having a lubricant passageway extending therethrough, one end of which lubricant passageway is connected to the lubricant header, and the other end of which lubricant passageway is connected to an individual flexible lubricant conduit, and each of said junction devices having an air passageway extending through the wall of said lubricant passageway and being in communication with the air header at one end thereof and in communication with an individual flexible air supply conduit at the other end thereof;— said individual flexible air supply conduits traversing and extending through said individual flexible lubricant supply conduits in a relatively loose manner.

8. A centralized lubricating system, including, a relatively low-pressure lubricant feeding unit, a main supply header extending from said unit, a plurality of individual pressure-boosting devices having high pressure lubricant chambers in connection with said header, piston means for developing relatively high pressure within each chamber and means for controlling the lubricant feeding unit by the pressure of the lubricant in said supply header.

9. A centralized lubricating system, including, a relatively low-pressure lubricant feeding unit, a main supply header extending from said unit, a plurality of individual pressure-boosting devices having high-pressure lubricant chambers in connection with said header, piston means for developing relatively high pressure within each chamber, and pressure-responsive means for controlling the pressure developed by said feeding unit in said header, and means for individually and selectively operating the pressure boosting devices.

10. A centralized lubricating system, including, a relatively low pressure feeding unit, a main supply header extending from said unit having a plurality of overhead outlets, a plurality of pendent, individual pressure-boosting devices having relatively high pressure lubricant chambers flexibly connected with said header, piston means for developing relatively high pressure within each chamber, and means for controlling the lubricant feeding unit by the pressure of the lubricant in said supply header.

11. A centralized lubricating system, including, a relatively low pressure lubricant feeding unit, a main supply header extending from said unit having a plurality of overhead outlets, a plurality of pendent, individual pressure-boosting devices having relatively high pressure lubricant chambers flexibly connected with said header, piston means for developing relatively high pressure within each chamber, and pressure-responsive means for controlling the pressure developed by said feeding unit in said header, and means for individually and selectively operating the pressure-boosting devices.

12. A lubricating system for lubricating automobiles comprising a relatively low pressure lubricant forcing device, a lubricant supply header connected to said forcing device, having a plurality of overhead outlets, a plurality of flexible conduits connected to said overhead outlets, respectively, a relatively high pressure, pendent, lubricant gun for each flexible conduit having a lubricant chamber connected to the end of the respective flexible conduit, a main air supply source, conduits extending from said source to said lubricant guns, said lubricant guns including air cylinders and pistons in said air cylinders for discharging the lubricant in said lubricant chambers, said cylinders connected to said main air supply source, and means for individually and selectively controlling the connection of said air cylinders to said air supply source.

13. A lubricant system for lubricating automobiles comprising a relatively low pressure lubricant forcing device, a lubricant supply header connected to said forcing device, having a plurality of overhead outlets, a plurality of flexible conduits connected to the overhead outlets of said header, a pendent, pneumatically operated lubricant discharge device at the end of each flexible conduit, a main air supply conduit, individual air conduits extending from said main air supply conduit to said pneumatically operated lubricant discharge device for operating the same, and means at each pneumatically operated lubricant discharge device for individually and selectively operating the pneumatically operated lubricant discharge devices.

14. In a device of the class described, a lubricant pumping unit, a lubricant supply header extending therefrom, having a plurality of overhead outlets, an air supply header connected to a source of compressed air having a plurality of overhead outlets; individual pendent flexible lubricant supply conduits connected to the outlets of said lubricant header; individual pendent flexible air supply conduits connected to the outlets of said air supply header, each of said individual flexible air supply conduits being disposed within one of said individual flexible lubricant supply conduits throughout the major extent thereof, a combination lubricant and air conduit junction device for each individual flexible lubricant supply conduit and individual flexible air supply conduit, each of said junction devices having a lubricant passageway extending therethrough, one end of which lubricant passageway is connected to the lubricant header, and the other end of which lubricant passageway is connected to an individual flexible lubricant conduit, and each of said junction devices having an air passageway extending through the wall of said lubricant passageway and being in communication with the air header at one end thereof and in communication with an individual flexible air supply conduit at the other end thereof;—said individual flexible air supply conduits traversing and extending through said individual flexible lubricant supply conduits in a relatively loose manner, and a pneumatic lubricant discharge device operatively connected to the free ends of said pairs of flexible lubricant and air conduits.

In witness whereof, I hereunto subscribe my name.

CLYDE G. BUTLER.